United States Patent [19]

Anderson et al.

[11] 4,410,829

[45] Oct. 18, 1983

[54] USE OF AMALGAMS IN SOLENOIDAL ELECTRIC FIELD LAMPS

[75] Inventors: John M. Anderson, Scotia; Peter D. Johnson, Schenectady, both of N.Y.

[73] Assignee: General Electric Company, Schenectady, N.Y.

[21] Appl. No.: 400,326

[22] Filed: Jul. 21, 1982

Related U.S. Application Data

[62] Division of Ser. No. 214,903, Dec. 10, 1980, abandoned, which is a division of Ser. No. 954,411, Oct. 25, 1978, Pat. No. 4,262,231.

[51] Int. Cl.[3] ........................ H01J 19/28; B23K 31/00

[52] U.S. Cl. ........................................ 313/490; 445/31; 228/220

[58] Field of Search ........................... 445/31; 228/220; 313/490

[56] References Cited

U.S. PATENT DOCUMENTS 4,262,231 4/1981 Anderson et al. .................. 313/490

*Primary Examiner*—Eugene R. Laroche
*Assistant Examiner*—Vincent DeLuca
*Attorney, Agent, or Firm*—William H. Steinberg; James C. Davis, Jr.; Marvin Snyder

[57] ABSTRACT

A lead-tin-bismuth alloy is disposed within a solenoidal electric field lamp to control the mercury vapor pressure. In accordance with one embodiment of the present invention, the alloy is placed within the tip-off region of the lamp envelope. The alloy is fixed within the tip-off region by a means of wetting the alloy to a metal wire structure such as a helix or a cylindrical screen. Alternatively, the alloy may be placed on an interior surface of the envelope by first wetting the glass with a layer of indium. Additionally, methods for wetting the lead-tin-bismuth alloy to the metal wire include firing the alloy in contact with the wire in a hydrogen atmosphere at a sufficiently high temperature to wet the alloy to the wire. The present invention permits the control of mercury vapor pressure in solenoidal electric field discharge lamps.

13 Claims, 4 Drawing Figures

USE OF AMALGAMS IN SOLENOIDAL ELECTRIC FIELD LAMPS

This application is a division of application Ser. No. 214,903, filed Dec. 10, 1980, abandoned, which is a division of Ser. No. 954,411, filed Dec. 25, 1978, now U.S. Pat. No. 4,262,231.

BACKGROUND OF THE INVENTION

This invention relates to solenoidal electric field discharge lamps, and more particularly, to placement of an alloy within the lamp so as to permit the control of mercury vapor pressure within the lamp.

Fluorescent lamps, including solenoidal electric field discharge lamps, operate with the greatest efficiency at a mercury vapor pressure of approximately 7 microns (that is, 7 millitorr). This vapor pressure corresponds to equilibrium with the mercury liquid phase at approximately 40° C. At this mercury vapor pressure, the greatest flux of ultraviolet radiation from the plasma arrives at the phosphor covered wall for a given power input to the positive column discharge of the lamp. However, solenoidal electric field (SEF) discharge lamps are much more compact than conventional tubular fluorescent lamps and thus power densities in SEF lamps are significantly higher. For example, the power input to the discharge plasma divided by the phosphored envelope area is used as a measure of phosphor loading and it is approximately ten times greater in the SEF lamp than in the conventional tubular fluorescent lamp. Thus, the SEF lamp envelope tends to operate at a higher temperature and is typically measured to be approximately 60° C. at its coolest point. The ballast compartment associated with such SEF lamps also runs at approximately the same temperature, that is, approximately 60° C. As a consequence, it is extremely difficult to find a location on the SEF lamp operating at approximately 40° C. for the placement of liquid phase mercury.

The problem of mercury vapor pressure control under varying temperature conditions is solved, at least in part, through the use of various alloys capable of absorbing mercury from its gaseous phase in varying amounts depending upon temperature conditions. Such alloys are known in the fluorescent lamp arts and in particular, certain alloys are described in an article by Bloem et al., titled "Some New Mercury Alloys for Use in Fluorescent Lamps", appearing in Volumne 6, No. 3, of the Journal of the IES, on page 141 in April 1977. The aforementioned article is hereby incorporated herein by reference as background material. Particularly described therein as useful alloys capable of forming amalgams with mercury include a lead-bismuth-tin alloy and a bismuth-indium alloy. The lead-bismuth-tin alloy also possesses the useful property that vapor pressure of mercury is not strongly suppressed at room temperature. Typically a mercury vapor pressure suppression of approximately 50 percent below that over pure mercury results with the use of the lead-bismuth-tin alloy at 20° C., i.e., room temperature. This is a minimal mercury vapor pressure suppression and it permits easier starting of the lamp at room temperature. The use of lead-tin-bismuth alloy also produces a relatively high luminous output over a wide temperature range. However, above a temperature of approximately 90° C., temperature control is lost. This is not, however, a significant problem since the typical SEF lamp operates at a temperature below 90° C.

The placement of these amalgamating alloys in an SEF lamp is, however, a problem for several reasons. For stable, long-term operation the alloy should be placed in a relatively cool, temperature stable location. For purposes of alloy placement, this requirement precludes those regions in the immediate vicinity of a toroidal core employed in SEF lamps, which operate at a higher overall temperature than conventional lamps because of their compactness and the concomitant increase in power density levels. Additionally, alloys which are useable for controlling mercury vapor pressure do not wet well to the glass envelopes employed in SEF lamps even at high temperatures. Thus, placement on the envelope itself, away from the core, is difficult.

SUMMARY OF THE INVENTION

In accordance with a preferred embodiment of the present invention, the amalgamating alloy is wetted to a metal wire structure by heating the alloy and wire in contact in a hydrogen atmosphere at a temperature sufficiently high to wet the alloy to the wire. The wire structure in a preferred embodiment of the present invention comprises a helical wire coil having an extension in contact with the core and possessing a curved wire tail acting as a flexible spring to hold the helical coil in a relatively fixed position. In accordance with another preferred embodiment of the present invention, the amalgamating alloy is wetted to a wire screen which is wrapped into the shape of a cylinder having a diameter selected so that the cylinder snuggly fits into the tip-off region of the lamp envelope without obstructing the tip-off region for purposes of gas evacuation or insertion. Alternatively, the amalgamating alloy is disposed on an inner surface of the lamp envelope by first wetting the glass envelope with a layer of indium. A method is also disclosed for easy fabrication of a helical wire coil wetted with an amalgamating alloy.

DETAILED DESCRIPTION OF THE INVENTION

Figure 1:
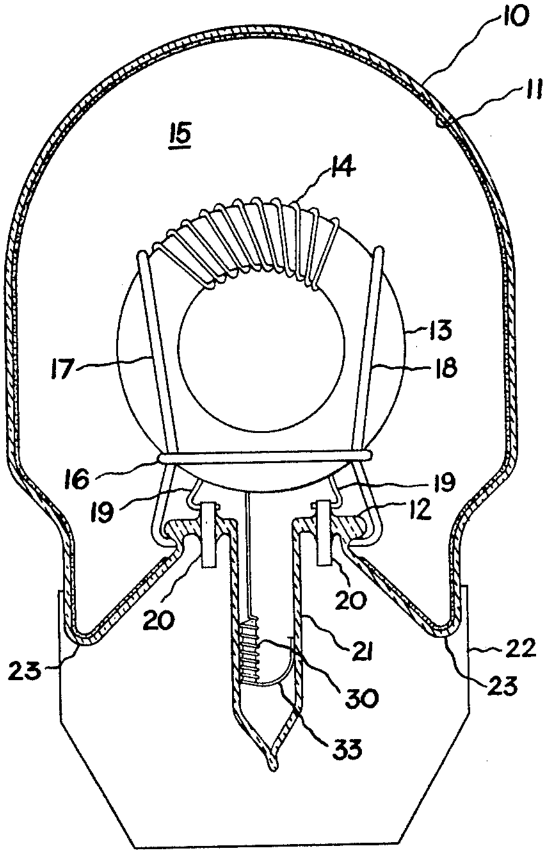
FIG. 1 is a partial cross-sectional side elevation view illustrating an embodiment of the present invention in which the alloy is contained in the tip-off region of an SEF lamp by placement in a helical coil.

FIG. 1 illustrates a typical solenoidal electric field lamp in which the core is disposed within the gaseous discharge medium. In FIG. 1, envelope 10, which is typically glass, encloses an evacuable volume and is coated internally with phosphor 11. The discharge within the gaseous medium 15 inside the lamp is caused by means of a solenoidal electric field induced by magnetic flux variations within toroidal core 13 comprising material having low magnetic reluctance, typically a ferrite. The core 13 may be mounted within the lamp by means of wire support members 17 and 18 which along with wire band member 16 functions to fixedly hold the toroidal core to the header 12 of the glass envelope 10. Envelope 10 also possesses a protruding tip-off portion 21 extending downwardly into the ballast region 22 of the lamp. The torroidal core 13 is electrically coupled to the ballast in region 22 through windings 14 connected by leads 19 to feed-through wires 20 disposed through the header 12. A more detailed description of SEF lamps is found in U.S. Pat. No. 4,017,764 issued Apr. 12, 1977 to John M. Anderson, an inventor on the application herein, which patent is also assigned to the same assignee as the instant application. This Anderson Patent is hereby incorporated herein as background material.

Figure 2:
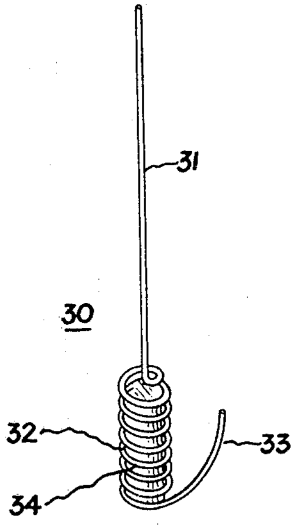
FIG. 2 is a perspective view detailing the helical coil employed in FIG. 1.

In accordance with a preferred embodiment of the present invention, an alloy capable of controlling the mercury vapor pressure within the lamp is disposed within the tip-off region 21 of the lamp envelope 10. In the configuration illustrated in FIG. 1, the alloy is wetted onto a helical coil assembly 30 which is placed in the tip-off region and positionally indexed by core 13 and extension 31. The end of the helical wire coil extends into a curved flexible extension 33 which serves to hold it in a relatively fixed position within the tip-off region 21. FIG. 2 illustrates details of the helical structure, in which positioning wire portion 31 is seen as an extension of the helical wire coil 32 which contains the alloy 34 which has previously been wetted to the metal wire, which preferably comprises either nickel or steel. The end of the helical coil opposite positioning portion 31 is extended into a curve flexible tail extending from the helix so as to press against the wall of the envelope in the tip-off region 21.

The above-mentioned helical wire coil structure is particularly useful in conjunction with an alloy of lead, bismuth, and tin, and in particular with such an alloy comprising 32 atomic percent lead, 52.5 atomic percent bismuth, and 15.5 atomic percent tin. This particular lead-bismuth-tin alloy melts at approximately 95° C. and hardens into a polycrystalline form which is easily cleaved. Also, when further alloyed with mercury to form an amalgam, this alloy melts at approximately 65° C. Since the amalgam has such a relatively low melting point, it is important that the alloy be attached within the lamp by wetting to a surface so that it does not move about the lamp when the lamp is physically handled, shipped, or otherwise subjected to mechanical shock. In this fashion, the above-mentioned helical wire coil structure provides an ideal mechanical and thermal location for the alloy in an SEF lamp. It is noted, though, that the surface of the specified lead-bismuth-tin alloy oxidizes when heated in air to its melting point. Thus, the alloy is introduced to the lamp at such a time in manufacture so that it is not exposed to air at a high temperature.

While the helical structure shown in FIG. 1 does not occupy the entire diameter of the tip-off region 21, the dimension of the helical coil may be selected so that the coil itself fits snuggly into the tip-off region in which case the tail 33 and positioning wire portion 31 may be eliminated from the structure. However, as shown in FIG. 2 it is important that the alloy wet the coil in such a manner that a central opening persists along the axis of the coil. This is particularly true in the configuration in which the helical wire coil has a diameter approximately the same as the diameter tip-off region so that evacuation of the lamp and appropriate backfilling may be accomplished through the tip-off 21. Additionally, the thermal contact of the wire, wetted with an amalgamating alloy, to the wall of the envelope in the tip-off region provides additional temperature stability.

In a typical SEF lamp having approximately the same dimensions as a conventional 100 watt incandescent lamp, that is having a gas volume of approximately 150 $cm^3$, approximately 100 mg of alloy is employed. In a typical lamp assembly process, the glass envelope is sealed together at the final seal region 23, evacuated of air, baked, backfilled with approximately 10 mgs of mercury and sufficient rare gas, such as argon, to a pressure of approximately 0.5 torr and finally the tip-off is sealed closed. While the mercury is preferably added directly, such as in the form of a small globule, an alternative method is to mix the mercury with an alloy such as those indicated above. In particular, the specific lead-tin-bismuth alloy cited above may be mixed with mercury to form an amalgam in which the mercury is present at a concentration between approximately 5 to 10 atomic percent.

The construction of the helical wire coil containing the alloy or amalgam is easily accomplished. For example, a coil of 20 mil steel wire is formed about a removable 1 millimeter diameter mandrel. Lead-bismuth-tin alloy is cast in the form of 1 millimeter diameter wire by melting it and pouring it into a heated 1 millimeter inside diameter, glass capillary tube. This alloy, like others, expands on freezing, and thus the capillary tube is cooled to below the freezing point of the alloy so that the tube is fractured and easily separated from the alloy wire which results. The wire is cut into segments and inserted into the helical coil. The length of the alloy wire is determined by the amount of alloy desired within the lamp. The coil, with the wire alloy inserted, is then heated in a hydrogen atmosphere to a temperature sufficient to cause wetting of the alloy to the wire which is preferably either nickel or steel. In particular, for the lead-bismuth-tin alloy referred to above, heating at a temperature between approximately 600° C. and approximately 650° C. for one hour is sufficient. This process prevents oxidation of the alloy and causes the alloy to wet well to the coil.

Since the tip-off region extends into the ballast region 22 of the SEF lamp, the temperature never exceeds approximately 90° C. and thus mercury vapor pressure is controllably confined to between approximately 5 and approximately 10 microns during typical operation during which the more typical operating vapor pressure is approximately 7 microns which is optimal for efficacious light output from the lamp. However, a structure for containing the alloy in a relatively cooler location is necessary for SEF type lamps because of the increased temperature which is a direct result of higher power density levels.

An alternative structure to the helical wire coil wetted with alloy provides a metal wire screen wetted with alloy and bent into a cylindrical shape. Said cylinder has a diameter approximately equal to the inside diameter of the tip-off region 21 so that said cylinder fits snuggly into the tip-off region and is held therein when the lamp is subjected to various mechanical shocks. Such a structure does not at all interfere with either lamp evacuation or backfilling through the tip-off region. Such a structure may be easily be fabricated by forming said alloy into a sheet and heating said sheet in contact with a wire screen, of approximately the same dimension, in a hydrogen atmosphere at a temperature sufficient to wet the alloy to the wire. Upon cooling, the screen with the alloy wetted to it is shaped into a cylinder of appropriate dimension and inserted into the tip-off region. Again, a nickel or steel wire is preferred and if the lead-bismuth-tin alloy is employed, and firing in a hydrogen atmosphere at a temperature between approximately 600° C. and approximately 650° C. for one hour is preferred. While many alloys may be employed, the aforemention lead-bismuth-tin alloy is preferred, because of its ability to control the mercury vapor pressure at the operating temperature of SEF lamps while not unduly suppressing the mercury vapor pressure at room temperature. Thus, SEF lamps manufactured in accordance with the present invention remain easily startable.

Figure 4:
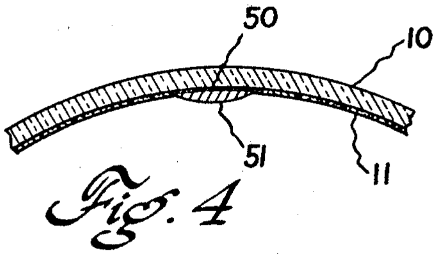
FIG. 4 is a cross-sectional side elevation view illustrating an embodiment of the present invention in which the alloy is disposed on an inner envelope surface by first wetting the surface with indium.
Figure 3:
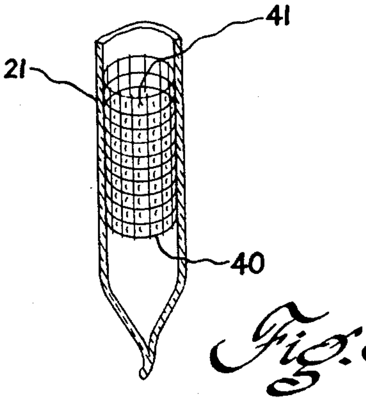
FIG. 3 is a partial cross-sectional side elevation view illustrating an embodiment of the present invention in which the alloy is disposed on a wire screen fitted into the tip-off region.

In still another embodiment of the present invention, the mercury vapor pressure controlling alloy is disposed on a surface of the interior wall of the envelope 10. However, since alloys in general and lead-bismuth-tin alloy, in particular, does not wet well to glass surfaces, even at temperatures as high as 500° C., it is first necessary to coat a phosphor-free area of the glass, preferably at the top most portion of the envelope, most distant from the ballast portion, with a thin layer of indium which does in fact wet well to glass. Then approximately 100 mgs of alloy is melted onto the indium. This structure is illustrated in FIG. 4 where alloy 51 is shown melted onto a phosphor-free portion of the lamp envelope 10 in an area which has first been wetted with indium 50. The alloy 51 acts just like the alloy in the configurations shown in FIGS. 1 and 3.

From the above, it may be appreciated that the present invention provides placement means for alloys in SEF lamps used to control mercury vapor pressure. The structures and methods provided by the present invention act to physically maintain the alloys used in desirable locations within the lamp in spite of the high power density levels and high temperatures of SEF lamps and also in spite of the mechanical shocks to which such a lamp may be subjected. The mercury pressure is thus controlled at a level promoting optimal lamp efficiency with minimal energy consumption.

While this invention has been described with reference to particular embodiments and examples, other modifications and variations will occur to those skilled in the art in view of the above teachings. Accordingly, it should be understood that the appended claims are intended to cover all such modifications and variations as fall within the true spirit of the invention.

The invention claimed is:

1. A method of forming a helical wire coil containing a lead-bismuth-tin alloy useful for controlling the mercury vapor pressure in a solenoidal electric field discharge lamp, comprising the steps of:

casting said alloy into a tubular segment insertable into said helical wire coil;

inserting said segment into said coil; and heating said coil and alloy in a hydrogen atmosphere at a temperature sufficient to wet said alloy to said wire.

2. The method of claim 1 in which said casting step comprises:

pouring melted alloy into a fracturable capillary tube; and cooling said alloy so as to expand and fracture said tube.

3. The method of claim 1 in which said heating occurs at a temperature of between approximately 600° C. and approximately 650° C.

4. The method of claim 3 in which said heating occurs for approximately one hour.

5. The method of claim 1 in which said lead, bismuth, and tin are present in the ratio of 32:52.5:15.5 atomic percent.

6. The method of claim 1 in which said wire comprises material selected from the group consisting of nickel and steel.

7. A method of forming a cylindrical screen containing a lead-bismuth-tin alloy useful for contolling the mercury vapor pressure in a solenoidal electric field discharge lamp, comprising the steps of:

forming said alloy into a sheet;

heating said alloy sheet in contact with a wire screen of approximately the same dimension as said sheet, in a hydrogen atmosphere at a temperature sufficient to wet said alloy to said wire; and bending said screen into a cylindrical shape.

8. The method of claim 7 in which said heating occurs at a temperature of between approximately 600° C. and approximately 650° C.

9. The method of claim 7 in which said heating occurs for approximately one hour.

10. The method of claim 7 in which said lead, bismuth, and tin are present in the ratio 32:52.5:15.5 atomic percent.

11. The method of claim 7 in which said screen comprises material selected from the group consisting of nickel and steel.

12. A method of wetting lead-bismuth-tin alloy to metal comprising:

heating said alloy in contact with said metal in a hydrogen atmosphere at a temperature sufficient to wet said alloy to said metal.

13. The method of claim 12 in which said heating occurs at a temperature of between approximately 600° C. and approximately 650° C.

* * * * *